US012074776B1

(12) United States Patent
Gurnani et al.

(10) Patent No.: US 12,074,776 B1
(45) Date of Patent: Aug. 27, 2024

(54) PROVIDING HIGH PERFORMANCE INTERNET OF THINGS DATA INGESTION AND PROCESSING

(71) Applicant: Accenture Global Solutions Limited, Dublin (IE)

(72) Inventors: Prakash Gurnani, Pune (IN); Devjyoti Sengupta, Hyderabad (IN); Shagun Bansal, Gurgaon (IN); Sambaran Dutta, Bengaluru (IN); Koushik M. Vijayaraghavan, Chennai (IN); Radhika Suryakant Jagtap, Pune (IN); Ranjini Ramachandran Thottathil, Chalakudy (IN); Ravi Yadav, Gurugram (IN); Amit Dhiman, Gurugram (IN); Sivanandam Thirunavukarasu, Yamunanagar (IN); Dhamini Kandhavelu, Vadalur (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 18/189,036

(22) Filed: Mar. 23, 2023

(51) Int. Cl.
*H04L 43/028* (2022.01)
*H04L 41/12* (2022.01)
*H04L 43/04* (2022.01)

(52) U.S. Cl.
CPC ............ *H04L 43/028* (2013.01); *H04L 41/12* (2013.01); *H04L 43/04* (2013.01)

(58) Field of Classification Search
CPC ........ H04L 43/028; H04L 43/04; H04L 41/12
See application file for complete search history.

(56) References Cited

U.S. PATENT DOCUMENTS

2022/0377149 A1\* 11/2022 Vichare .................. H04L 43/06

\* cited by examiner

*Primary Examiner* — Brian Whipple
(74) *Attorney, Agent, or Firm* — Polsinelli P.C.

(57) ABSTRACT

A device may receive, from Internet of Things (IOT) devices, telemetry data in a variety of formats and may convert the telemetry data to converted telemetry data in a first unified format. The device may receive, from one or more of the IoT devices, offline IoT data in a variety of formats and may convert the offline IoT data to converted offline IoT data in a second unified format. The device may receive events from one or more of the IoT devices and may identify anomalies based on the telemetry data and in near-real time relative to receiving the telemetry data. The device may store the converted telemetry data, the converted offline IoT data, the events, and the anomalies, as stored data, in a data structure, and may perform actions based on the stored data.

20 Claims, 11 Drawing Sheets

PROVIDING HIGH PERFORMANCE INTERNET OF THINGS DATA INGESTION AND PROCESSING

BACKGROUND

The Internet of things (IOT) describes physical objects, or groups of physical objects, with sensors, processing ability, software, and other technologies that connect and exchange data with other devices and systems over communications networks. An IoT device may include anything with a sensor that can transmit data from one object to another object via a communications network. An IoT device may include a wireless sensor, software, an actuator, a computer device, and/or the like.

SUMMARY

Some implementations described herein relate to a method. The method may include receiving, from IoT devices, telemetry data in a variety of formats and converting the telemetry data to converted telemetry data in a first unified format. The method may include receiving, from one or more of the IoT devices, offline IoT data in a variety of formats and converting the offline IoT data to converted offline IoT data in a second unified format. The method may include receiving one or more events from one or more of the IoT devices and identifying one or more anomalies based on the telemetry data and in near-real time relative to receiving the telemetry data. The method may include storing the converted telemetry data, the converted offline IoT data, the one or more events, and the one or more anomalies, as stored data, in a data structure, and performing one or more actions based on the stored data.

Some implementations described herein relate to a device. The device may include one or more memories and one or more processors coupled to the one or more memories. The one or more processors may be configured to receive IoT device data associated with IoT devices and register the IoT devices with the device based on the IoT device data. The one or more processors may be configured to receive, from the IoT devices, telemetry data in a variety of formats and convert the telemetry data to converted telemetry data in a first unified format. The one or more processors may be configured to receive, from one or more of the IoT devices, offline IoT data in a variety of formats and convert the offline IoT data to converted offline IoT data in a second unified format. The one or more processors may be configured to receive one or more events from one or more of the IoT devices and identify one or more anomalies based on the telemetry data and in near-real time relative to receiving the telemetry data. The one or more processors may be configured to store the converted telemetry data, the converted offline IoT data, the one or more events, and the one or more anomalies, as stored data, in a data structure, and perform one or more actions based on the stored data.

Some implementations described herein relate to a non-transitory computer-readable medium that stores a set of instructions. The set of instructions, when executed by one or more processors of a device, may cause the device to receive, from IoT devices, telemetry data in a variety of formats and convert the telemetry data to converted telemetry data in a first unified format. The set of instructions, when executed by one or more processors of the device, may cause the device to receive, from one or more of the IoT devices, offline IoT data in a variety of formats and convert the offline IoT data to converted offline IoT data in a second unified format. The set of instructions, when executed by one or more processors of the device, may cause the device to receive one or more events from one or more of the IoT devices, where the one or more events include one or more of a deletion of one of the IoT devices, an addition of a new IoT device, or a disconnection of one of the IoT devices. The set of instructions, when executed by one or more processors of the device, may cause the device to identify one or more anomalies based on the telemetry data and in near-real time relative to receiving the telemetry data and store the converted telemetry data, the converted offline IoT data, the one or more events, and the one or more anomalies, as stored data, in a data structure. The set of instructions, when executed by one or more processors of the device, may cause the device to perform one or more actions based on the stored data.

DETAILED DESCRIPTION

Figure 1A:
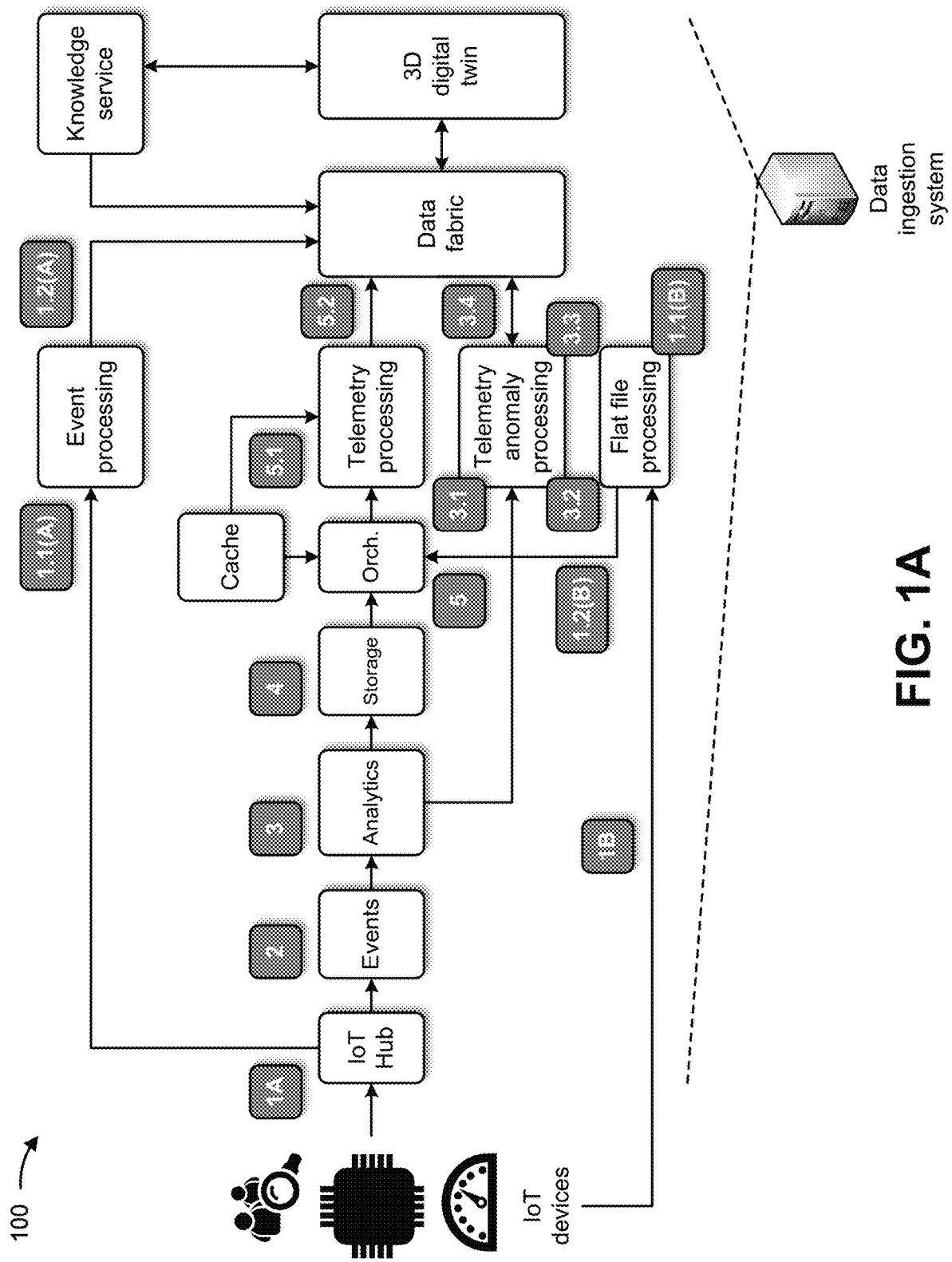
FIGS. 1A-1H are diagrams of an example implementation described herein.

The following detailed description of example implementations refers to the accompanying drawings. The same reference numbers in different drawings may identify the same or similar elements.

Industries may utilize large quantities of IoT devices to monitor machinery, processes, environments, and/or the like. However, current techniques for managing IoT devices fail to seamlessly integrate with the IoT devices and fail to determine insights from large volumes of unstructured data received from the IoT devices. Furthermore, updating current IoT management systems consumes an inordinate amount of time and resources, and failing to precisely utilize the IoT devices may result in hazardous conditions and legal liability in some industries (e.g., the chemical industry). Therefore, current techniques for managing IoT devices consume computing resources (e.g., processing resources, memory resources, communication resources, and/or the like), networking resources, and/or the like associated with failing to integrate with the IoT devices, failing to understand unstructured data received from the IoT devices, expending time to update current IoT management systems, handling liability associated with failing to identify hazardous conditions with the IoT devices, correcting hazardous conditions after incurring the liability for the hazardous conditions, and/or the like.

Some implementations described herein relate to a data ingestion system that provides high performance IoT data ingestion and processing. For example, the data ingestion system may receive IoT device data associated with IT devices and may register the IoT devices with the data ingestion system based on the IoT device data. The data ingestion system may receive, from the IoT devices, telemetry data in a variety of formats and may convert the telemetry data to converted telemetry data in a first unified format. The data ingestion system may receive, from one or more of the IoT devices, offline IoT data in a variety of formats and may convert the offline IoT data to converted offline IoT data in a second unified format. The data ingestion system may receive one or more events from one or more of the IoT devices and may identify one or more anomalies based on the telemetry data and in near-real time relative to receiving the telemetry data. The data ingestion system may store the converted telemetry data, the converted offline IoT data, the one or more events, and the one or more anomalies, as stored data, in a data structure, and may perform one or more actions based on the stored data.

In this way, the data ingestion system provides high performance IoT data ingestion and processing. For example, the data ingestion system may provide a comprehensive adaptive solution that receives heterogenous data from industry assets (e.g., IoT devices) of an industrial ecosystem. The data ingestion system may include a collection of cloud-based serverless components, chained together to transport data from multiple source systems, such as IoT devices, to a target destination, such as a data structure. The adaptive nature of the data ingestion system enables addition and customization of components into a framework based on changing business needs. The data ingestion system may process large volumes of low latency data in near-real time before storing the data to a destination, which enables faster decision making even for complex processes. This, in turn, conserves computing resources, networking resources, and/or the like that would otherwise have been consumed in failing to integrate with the IoT devices, failing to understand unstructured data received from the IoT devices, expending time to update current IoT management systems, handling liability associated with failing to identify hazardous conditions with the IoT devices, correcting hazardous conditions after incurring the liability for the hazardous conditions, and/or the like.

FIGS. 1A-1H are diagrams of an example 100 associated with providing high performance IoT data ingestion and processing. As shown in FIGS. 1A-1H, example 100 includes multiple IoT devices associated with a data ingestion system. Each of the IoT devices may include a sensor, a monitor, a wireless communication device, a mobile phone, a user equipment, a video camera, and/or the like. The data ingestion system may include a system that provides high performance IoT data ingestion and processing. In some implementations, the data ingestion system may be a cloud-based system of components (e.g., a Microsoft Azure cloud computing platform, an Amazon Web Services (AWS) cloud computing platform, and/or the like). Further details of the IoT device and the data ingestion system are provided elsewhere herein.

FIG. 1A depicts components of the data ingestion system as being provided by a Microsoft Azure cloud computing platform. As shown in FIG. 1A, the data ingestion system may include an IoT hub component, an events component, an analytics component, a storage component, an orchestrator component, a cache component, an event processing component, a telemetry processing component, a telemetry anomaly processing component, a flat file processing component, a data fabric component, a knowledge service component, a three-dimensional (3D) digital twin component, and/or the like. As shown by reference number 1A of FIG. 1A, the IoT hub component may receive telemetry data (e.g., messages) from the IoT devices connected to the data ingestion system and one or more events. As shown by reference number 2, the events component may consolidate the one or more events received by the IoT hub component for further ingestion processing. As shown by reference number 3, the analytics component may analyze large volumes of the telemetry data (e.g., streaming data), may identify patterns and relationships in the telemetry data generated by the IoT devices, and may utilize the patterns to trigger data ingestion and anomaly detection and processing.

As shown by reference number 4 of FIG. 1A, the storage component may store the telemetry data (e.g., in the form of blobs in a data structure (e.g., a database, a table, a list, and/or the like)), which may trigger an ingestion pipeline of the data ingestion system. Blob storage may be optimized for storing massive amounts of unstructured data. As shown by reference number 5, the orchestrator component may read cloud serverless functions and/or execution stage configurations from the data fabric component and/or the cache component, and may determine an execution order of the processing components of the data ingestion system. As shown by reference number 5.1, the telemetry processing component may include a collection of processing components in the form of execution stages. As shown by reference number 5.2, the telemetry processing component may store the processed telemetry data in the data fabric component (e.g., a relational data structure) in near-real time relative to receipt of the telemetry data from the IoT devices.

As shown by reference number 3.1 of FIG. 1A, the telemetry anomaly processing component may validate and identify anomalies in the telemetry data based on the patterns and relationships identified in the telemetry data by the analytics component. As shown by reference number 3.2, the telemetry anomaly processing component may refresh configured rules for the IoT devices (e.g., in the form of a reference data input of stream analytics query). As shown by reference number 3.3, the telemetry anomaly processing component may receive, from the data fabric component, new and/or updated rules for the IoT devices and may replace reference data based on the new and/or updated rules. As shown by reference number 3.4 the telemetry anomaly processing component may store the identified anomalies in the data fabric component.

As shown by reference number 1.1(A) of FIG. 1A, the IoT hub component may receive events, and may provide the events to the event processing component for further processing. As shown by reference number 1.2(A), the event processing component may receive the events from the IoT hub component, and may store the events in the data fabric component. As shown by reference number 1B, the flat file processing component may process offline or batch telemetry data generated by the IoT devices. As shown by reference number 1.1(B), the flat file processing component may push the offline or batch telemetry data to respective storage containers depending on a processing status (e.g., failed to process or processed). As shown by reference number 1.2(b), the flat file processing component may provide the offline or batch telemetry data to the orchestrator component for further processing.

The data ingestion system may be integrated with any number and/or type of IoT devices associated with an organization's assets, may ingest near-real time telemetry data at a high frequency, and may store the telemetry data in the data fabric component. The data ingestion system may format and contextualize the telemetry data based on the processing components. The processing components of the data ingestion system may be reordered based on a data structure-driven configuration approach once the telemetry data has been ingested. This enables the data ingestion system to be adaptive in nature via plug-and-play customizable compute components or new execution stage based on business requirements.

The data ingestion system may provide a high degree of customization by allowing creation of different compute instances via configuring sequence of existing cloud components or introducing new cloud components based on business requirements. The data ingestion system may enable any scale of modification without affecting the flow by performing minimal or no code changes. The telemetry anomaly processing component may analyze the telemetry data and may respond to threshold breaches as anomaly events in near-real time. The telemetry data may be passed through the analytics component, and complex threshold rules based on business requirements may be dynamically configured in the analytics component. The telemetry data may be filtered against the rules and passed to the telemetry anomaly processing component if there is a rule violation. For rule-violating telemetry data (e.g., anomalies), the telemetry anomaly processing component may register the anomalies as new events and may notify respective stakeholders about the anomalies (e.g., via an email notification, a push notification, a short message service (SMS) notification, and/or the like).

The data ingestion system may integrate the above-mentioned information with other infrastructures, such as the knowledge service component and/or the 3D digital twin component. This enables the data ingestion system to provide quicker and earlier detection of anomalies, which may enable users to strategize appropriate remedial actions. Thus, the data ingestion system helps to unleash the full potential of manufacturing and engineering units by minimizing unplanned downtime based on anomaly detection, remote monitoring, and resolution in near-real time.

Although FIG. 1A depicts components of the data ingestion system as being provided by a Microsoft Azure cloud computing platform, in some implementations, the components of the data ingestion system may be provided by another clouding computing platform, such as an AWS cloud computing platform.

Figure 1B:
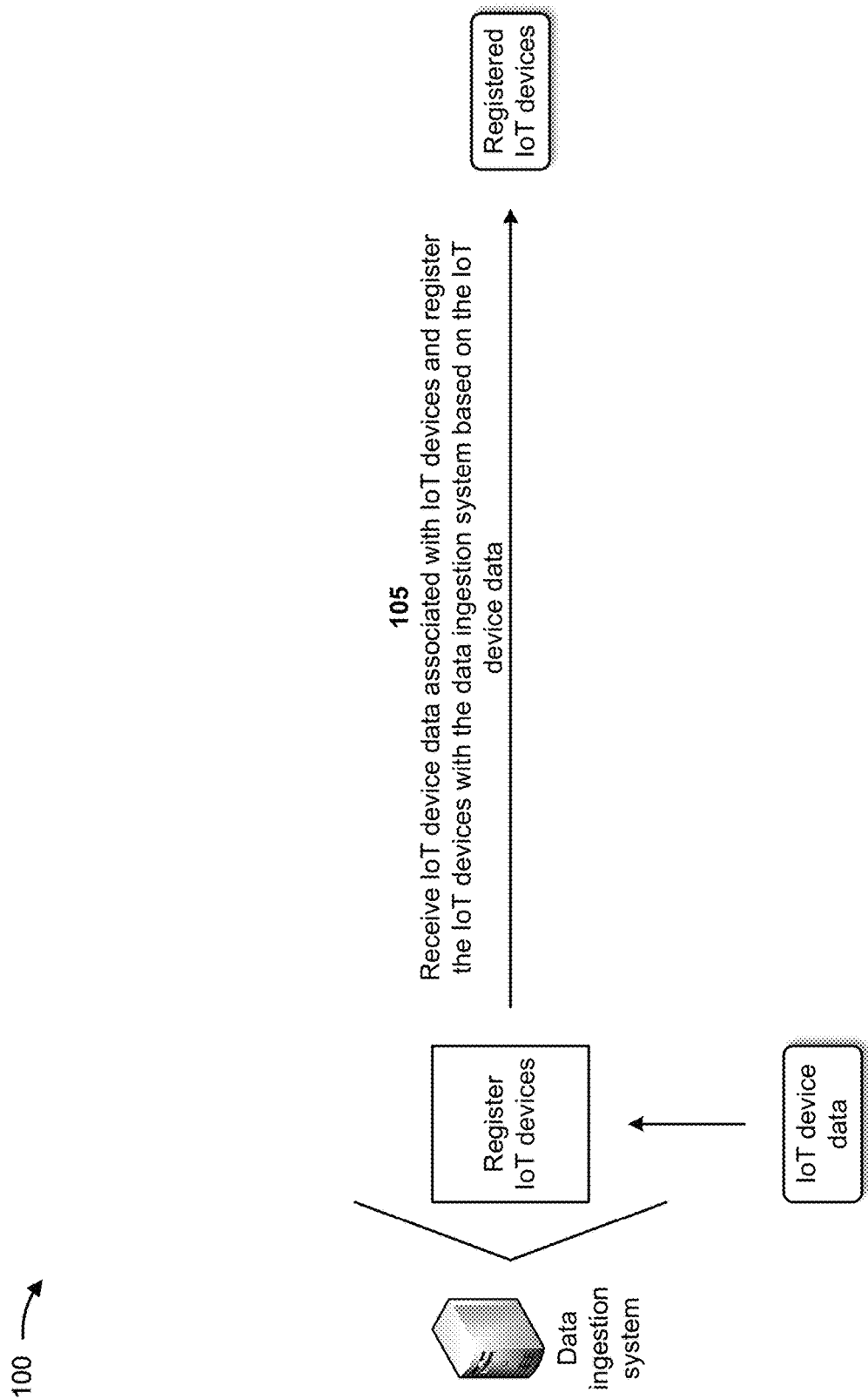

As shown in FIG. 1B, and by reference number 105, the data ingestion system may receive IoT device data associated with IoT devices and may register the IoT devices with the data ingestion system based on the IoT device data. For example, the IoT devices may generate IoT device data identifying types of IoT devices (e.g., sensors, cameras, and/or the like), manufacturers of the IoT devices, serial numbers of the IoT devices, interfaces for short range wireless communication protocols and/or long range wireless communication protocols, and/or the like. The IoT devices may provide the IoT device data to the data ingestion system, and the data ingestion system may receive the IoT device data from the IoT devices. The data ingestion system may register the IoT devices (e.g., to provide telemetry data) with the data ingestion system based on the IoT device data.

The data ingestion system may onboard any quantity of IoT devices or device simulators associated with an organization using the IoT hub component. Any IoT device configured with this device provisioning service may be registered with the IoT hub component. In some implementations, besides registering the IoT devices to provide telemetry data to the data ingestion system, the IoT hub component may also report incidental events of IoT device addition, deletion, disconnection, and/or the like.

Figure 1C:
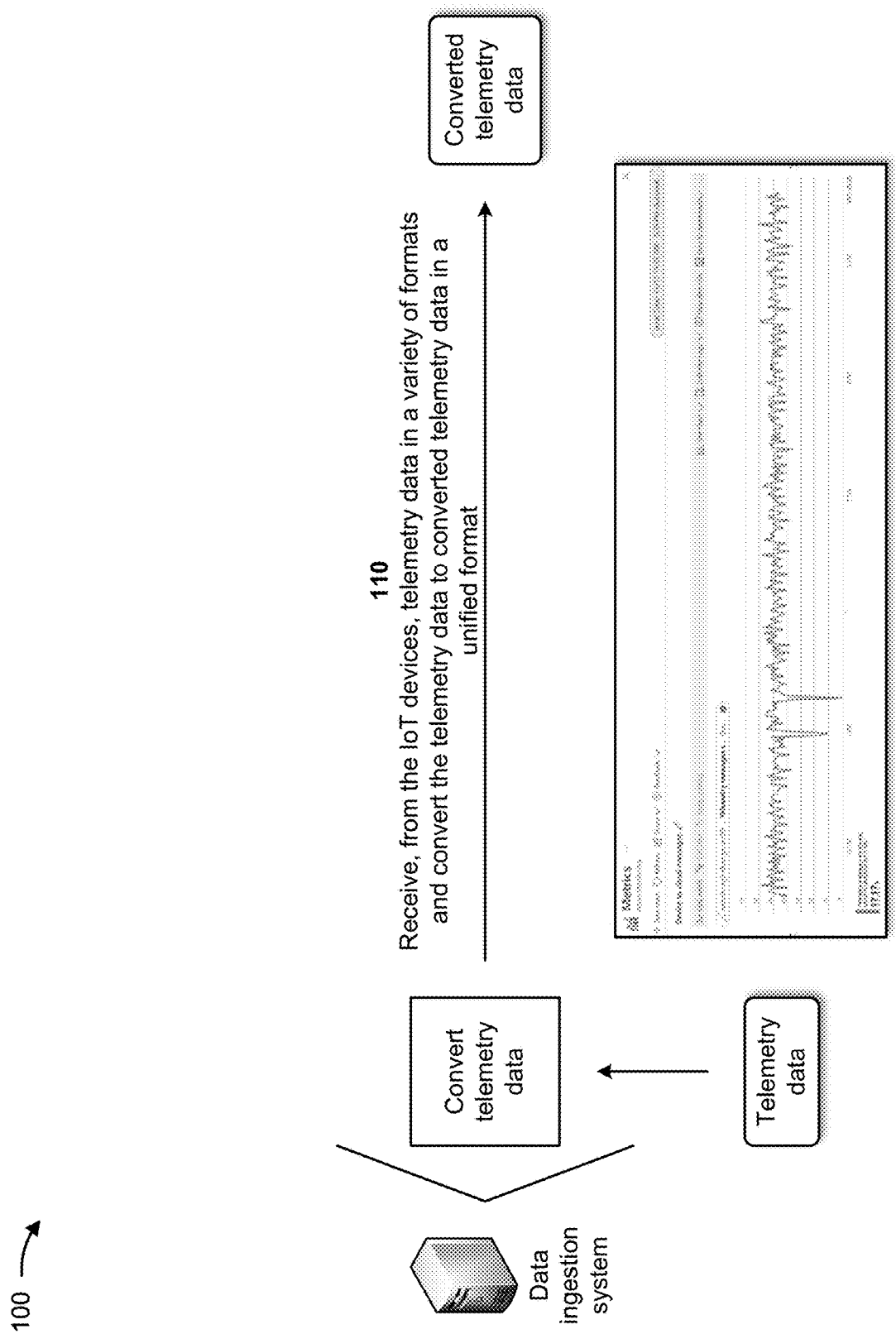

As shown in FIG. 1C, and by reference number 110, the data ingestion system may receive, from the IoT devices, telemetry data in a variety of formats and may convert the telemetry data to converted telemetry data in a unified format. For example, the IoT devices may perform measurements, capture video, and/or the like, and may generate telemetry data based on the measurements, the video, and/or the like. The IoT devices may provide the telemetry data to the data ingestion system, and the data ingestion system may receive the telemetry data.

In some implementations, handling the telemetry data may be challenging since the telemetry data may be continuously generated by multiple IoT devices and delivered in a wide variety of formats. For example, each IoT device may have a separate purpose such as measuring temperature, pressure, rotation, and/or the like. The IoT devices may be provided by different manufacturers and hence the telemetry data and the data format of the telemetry data may different. The data ingestion system may convert the telemetry data in the variety of formats into converted telemetry data in a unified format. In some implementations, the data ingestion system may utilize customizable filters to convert the telemetry data to the converted telemetry data in the unified format. Thus, the data ingestion system may perform lightweight extract, transform, an load (ETL) processes to provide users with a status of telemetry data transformation at every step.

In some implementations, the data ingestion system may process millions, billions, and/or the like of telemetry data points received from the IoT devices. The data ingestion system may enable multiple applications to concurrently process the telemetry data points, which in turn increases processing speed of the data ingestion system. The data ingestion system may receive, process, and analyze the telemetry data (e.g., with the analytics component) to determine powerful insights and drive real time actions.

The data ingestion system may utilize multiple execution stages in the form of serverless function applications. When the telemetry data is received and the data ingestion system identifies storage of the telemetry data (e.g., via a new blob creation in the form of a blob trigger), the data ingestion system may initiate the orchestrator component. The orchestrator component may read function configurations from the data structure and may determine an execution order of processing components which are chained together based on the type of telemetry data. The processing components are cloud native processing components that are chained together and are managed by the orchestrator component based on a sequencing order configured in the data structure based on business logic.

In some implementations, the cloud processing components may include a formatting component, a context component, a conversion component, and a storage connector component. The cloud processing components may include function applications that can be customized and configured as per business needs. The function applications may be executed by the orchestrator component based on the configuration. The formatting component may convert incoming raw telemetry data to a common structure payload. The context component may retrieve contextualized data about the IoT devices. The conversion component may convert properties of the telemetry data from one format to another format. The storage connector component may store the formatted telemetry data in a data structure (e.g., blob storage). The storage connector component may generate a new container for each IoT device type, and may store the telemetry data in respective containers.

Based on business requirements, the orchestrator component may determine a sequence of the cloud processing components and a quantity of processing stages. The orchestrator component may determine a chain of actions in the sequence based on predefined user configurations, such as a name or identifier of an execution stage, an endpoint path of a stage (e.g., where the stage is physically hosted), a type of execution stage, an execution order (e.g., to chain in a sequence), and/or the like. With the combination of these user configurations, the orchestrator component may define the chain of actions for each telemetry data point. The orchestrator component may receive an execution trigger based on a new telemetry data object (e.g., in the form of blob data stored in data structure), which makes enables the orchestrator component to process the telemetry data in near-real time.

In some implementations, the data ingestion system may provide a plug-and-play feature that creates new cloud processing components based on business needs and using a data structure-driven approach with configuration parameters. For example, a new function and/or execution stage may be created and configured into the data structure, and the orchestrator component may plug the new execution stage for further data processing into an updated chain of actions. In one example, the data ingestion system may create and host a new execution stage in the form of a function application. The data ingestion system may identify end points of the newly created function application, and may configure the end points in the orchestrator component with parameter details and an execution order of the new execution stage. The orchestrator component may automatically set the order of execution to include the new execution stage.

Figure 1D:
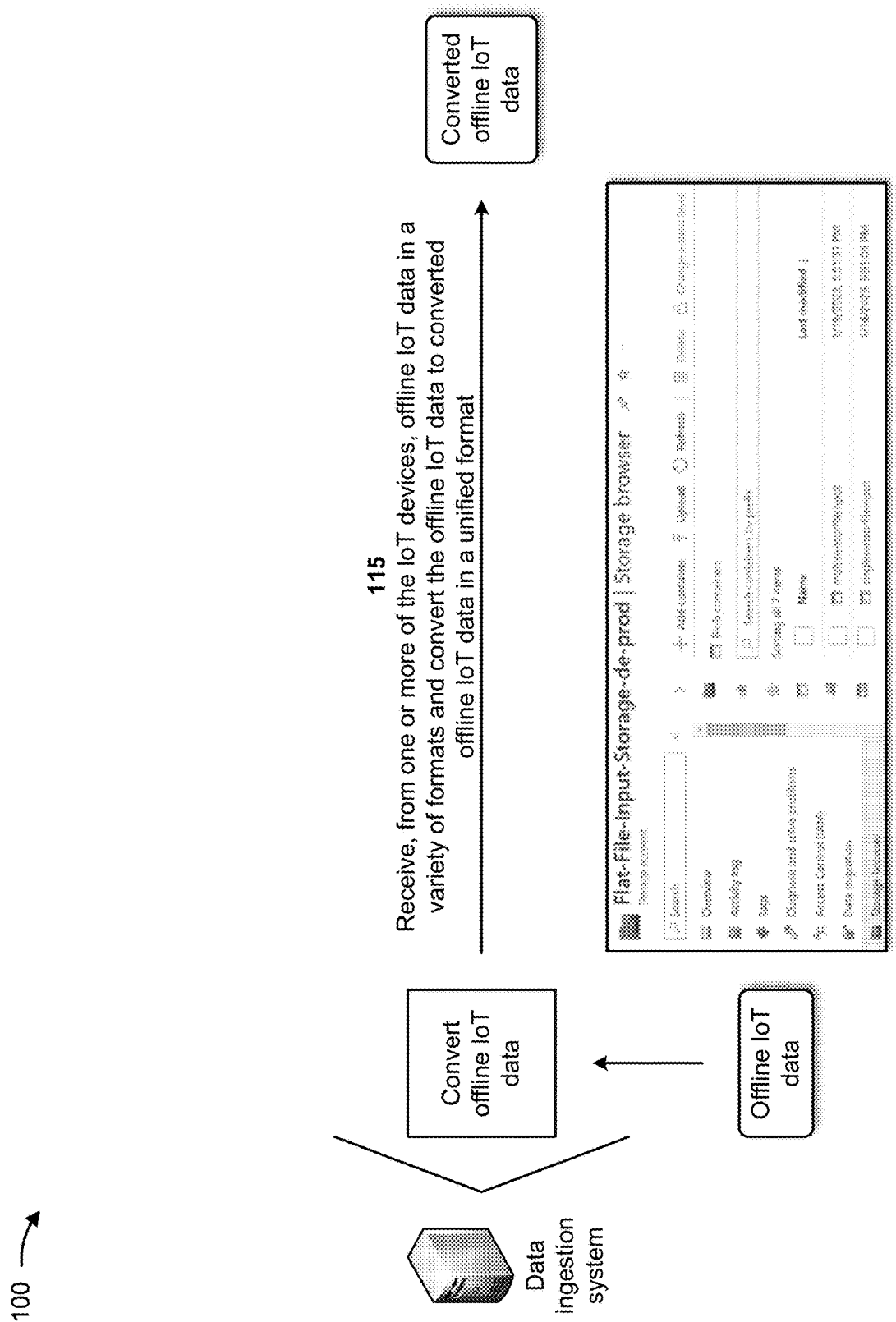

As shown in FIG. 1D, and by reference number 115, the data ingestion system may receive, from one or more of the IoT devices, offline IoT data in a variety of formats and may convert the offline IoT data to converted offline IoT data in a unified format. For example, whenever there is a disruption in connectivity between the data ingestion system and the IoT devices, the telemetry data generated by the IoT devices may be provided to a source system. However, it may be difficult to retrieve this offline IoT data from the source system because of security-related access issues. The data ingestion system overcomes this hurdle by receiving the offline IoT data in any file format, and processing the offline IoT data generated by a single IoT device or multiple IoT devices (e.g., batched data).

In some implementations, the flat file processing component of data ingestion system may process the offline or batched IoT data captured from the IoT devices in near-real time. The data ingestion system may receive the offline or batched IoT data in the form of files in various formats, such as an extensible markup language (XML) format, a JavaScript object notation (JSON), a comma-separated values (CSV) format, and/or the like. The data ingestion system may immediately process multiple files in such formats, where each file may contain IoT data from multiple IoT devices. In some implementations, the data ingestion system may receive, from one or more of the IoT devices, the offline IoT data in a variety of formats and may convert the offline IoT data to the converted offline IoT data in the unified or common format. In some implementations, the unified format for the converted telemetry data may be a first unified format, and the unified format for the converted offline IoT data may be a second unified format different from the first unified format.

Figure 1E:
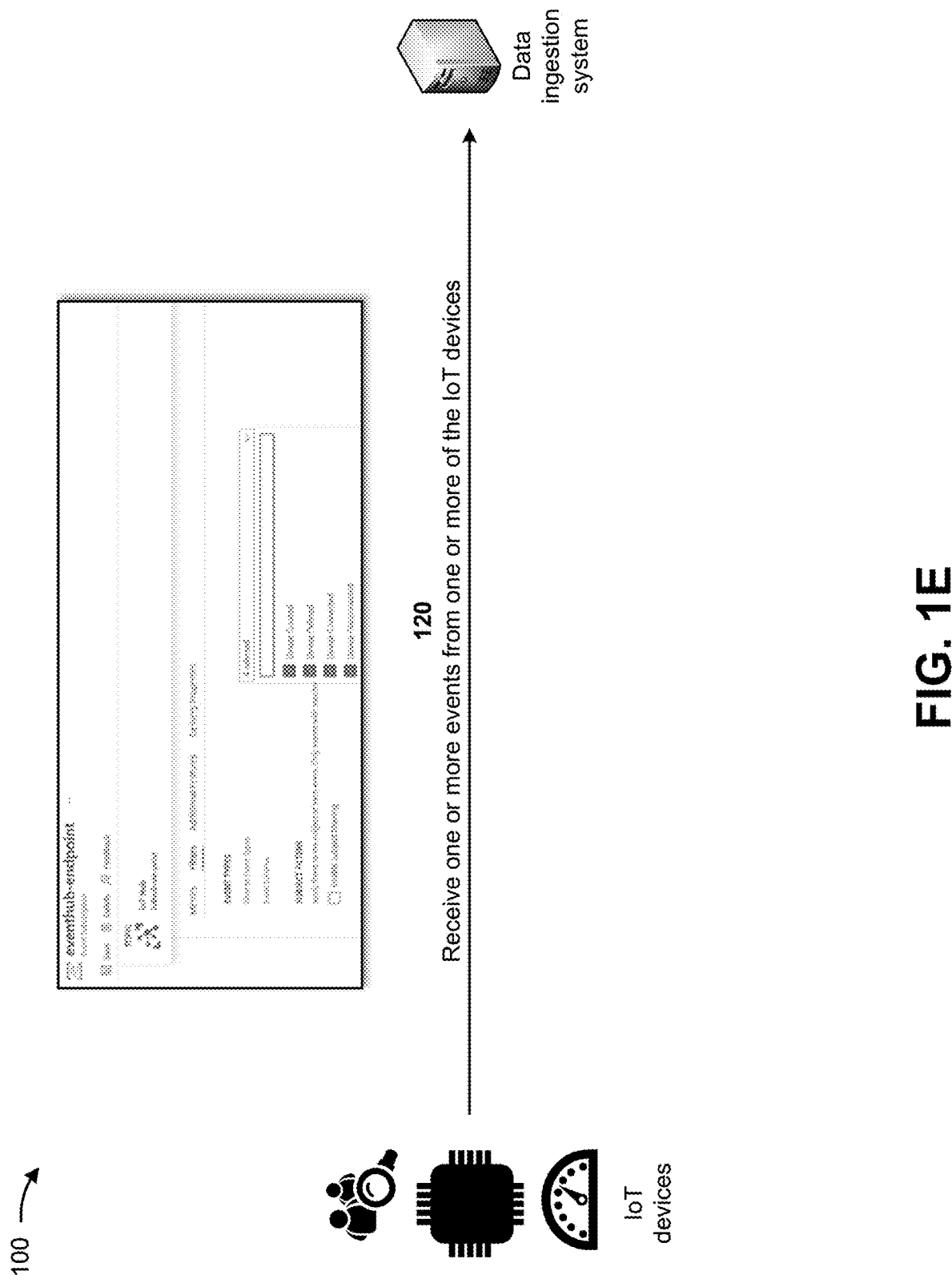

As shown in FIG. 1E, and by reference number 120, the data ingestion system may receive one or more events from one or more of the IoT devices. For example, the event processing component of the data ingestion system may receive the one or more events from the IoT hub component. In some implementations, the event processing component of the data ingestion system may process any incidental events, such deletion of an IoT device, addition of an IoT device, disconnection of an IoT device, and/or the like. The event processing component may provide indications of such events detected to other compute services of the data ingestion system. In some implementations, the event processing component may improve processing by the data ingestion system by filtering only relevant events based on a subject of an event. The event processing component may also enable event subscriptions for both custom and system events.

Figure 1F:
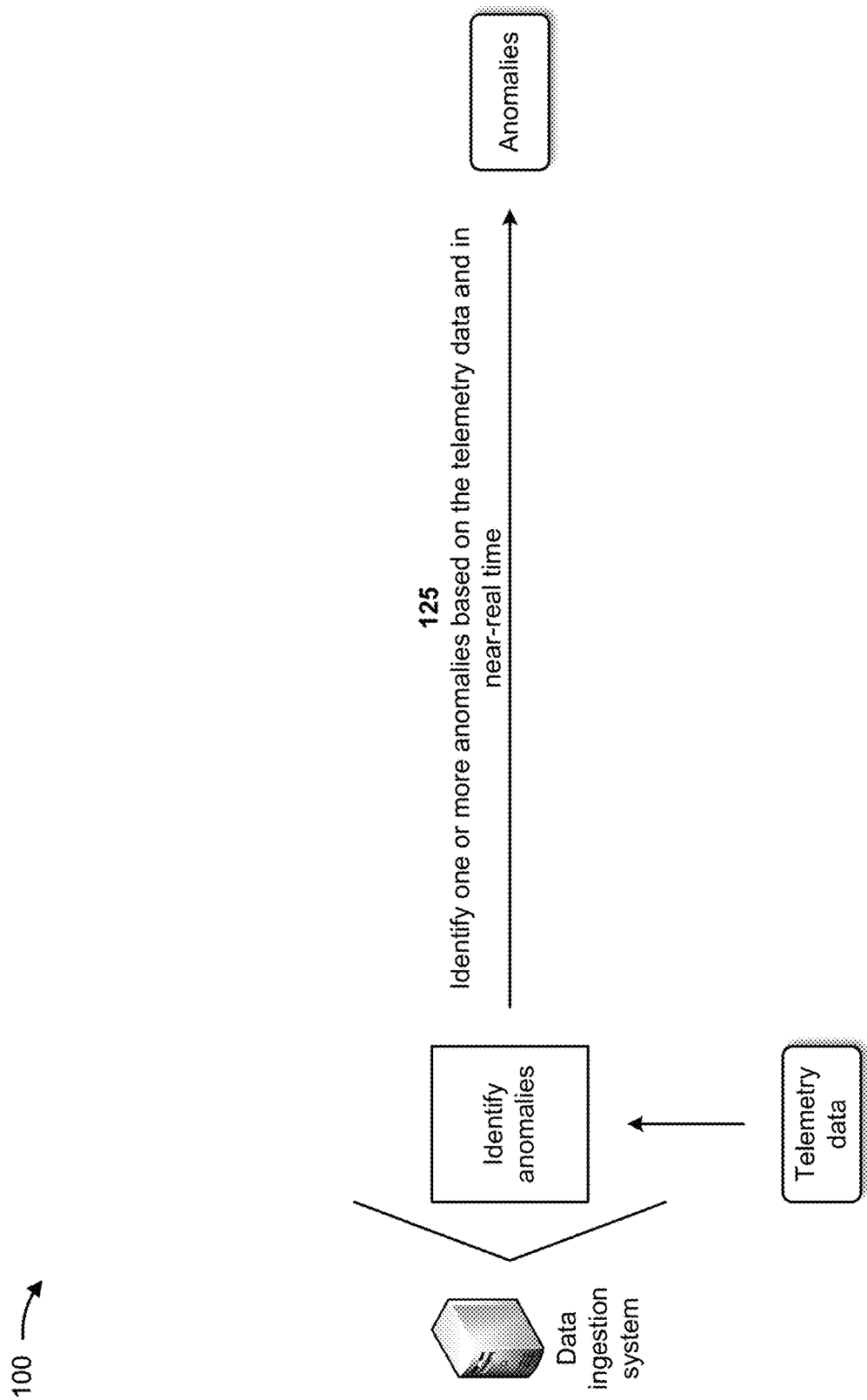

As shown in FIG. 1F, and by reference number 125, the data ingestion system may identify one or more anomalies based on the telemetry data and in near-real time. For example, the data ingestion system may detect one or more anomalies in the telemetry data received from the IoT devices by validating the telemetry data against preconfigured thresholds in near-real time (e.g., relative to receipt of the telemetry data). The anomaly detection may be utilized for live monitoring purposes and for detecting threats before the threats become greater problems. In some implementations, an anomaly may be generated based on faults or fatigue associated with industrial machines being monitored by the IoT devices. In some implementations, an anomaly may be a multivariate anomaly determined based on sudden changes in multiple data patterns, such as changes in a temperature, a pressure, a current, a vibration, and/or the like.

The data ingestion system may analyze the telemetry stream from the IoT devices and may identify threshold breaches as anomalies. For example, the analytics component of the data ingestion system may utilize predefined threshold values, with respect to a time period, with the telemetry data to detect out of bound values for a configured time window in the form of anomaly data points. A user of the data ingestion system may update the predefined thresholds and/or time periods, and the data ingestion system may utilize the updated predefined thresholds and/or time periods for anomaly detections. In some implementations, the telemetry anomaly processing component of the data ingestion system may validate and capture the anomalies identified by the analytics component. The telemetry anomaly processing component may store the anomalies in the data fabric component. The telemetry anomaly processing component may utilize notification services to notify users about the occurrence of anomalies. Different types of notifications can be generated based on subscription, such as an email notification, a push notification, an SMS notification, and/or the like. The telemetry anomaly processing component and/or the analytics component may be driven by a rule engine that is capable of hosting multiple models. These models may be modified as per the requirements and thus may cater to changing business needs of various industry domains.

Figure 1G:
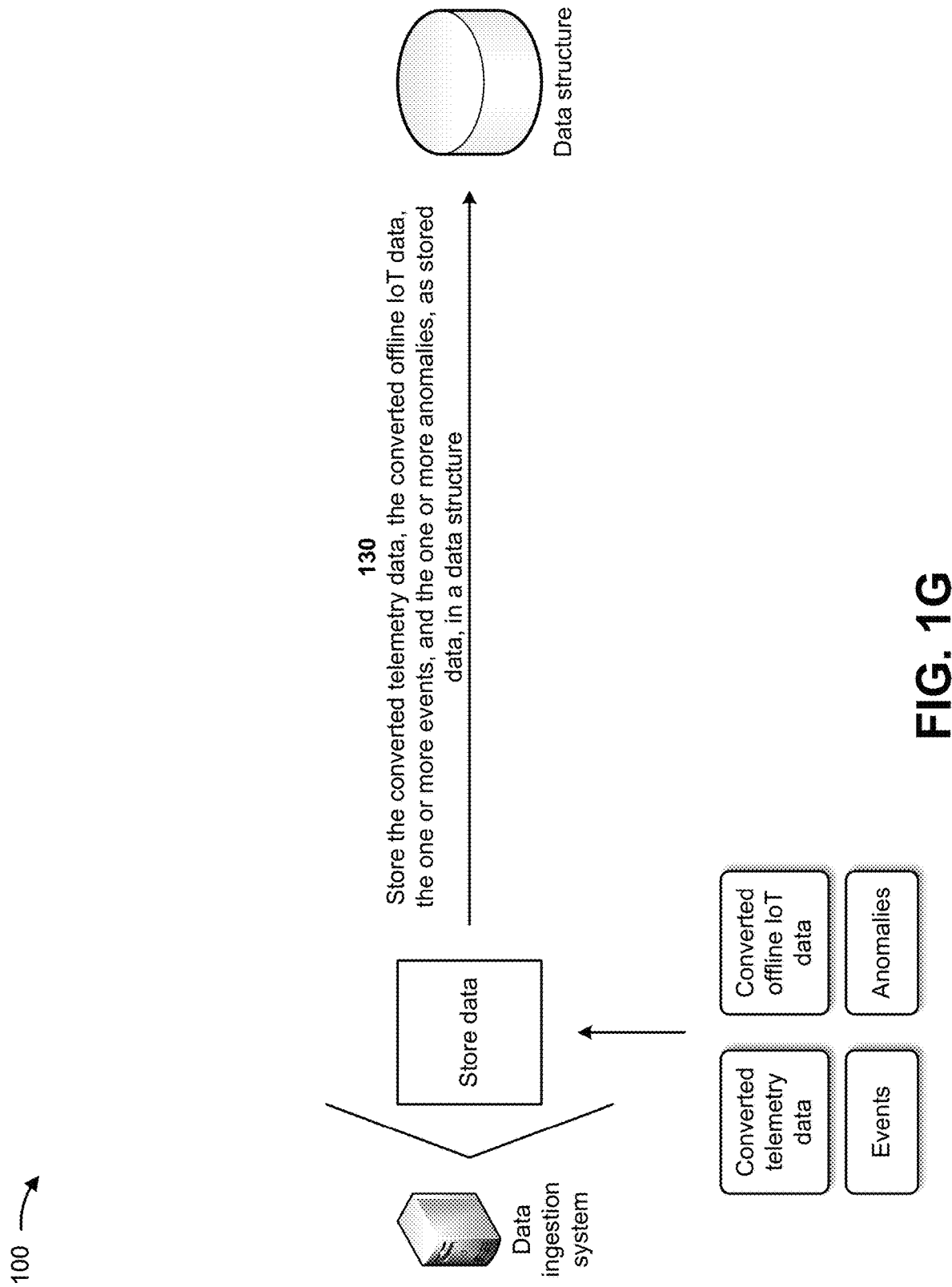

As shown in FIG. 1G, and by reference number 130, the data ingestion system may store the converted telemetry data, the converted offline IoT data, the one or more events, and the one or more anomalies, as stored data, in a data structure. For example, the data ingestion system may store the converted telemetry data, the converted offline IoT data, the one or more events, and the one or more anomalies, as stored data, in the data fabric component (e.g., the data structure of the data fabric component). In some implementations, the data ingestion system may store the converted telemetry data, the converted offline IoT data, the one or more events, and the one or more anomalies, as the stored data, in blob storage. The blob storage may be optimized for storing massive amounts of unstructured data that does not adhere to a particular data model or definition, such as text or binary data.

In some implementations, the data ingestion system may include a relational database (e.g., a structured query language (SQL) database) to store the converted telemetry data, the converted offline IoT data, the one or more events, and the one or more anomalies, as the stored data, in near-real time. The data ingestion system may also develop and plug in connectors for any type of database, adding flexibility of consuming data from any database as per user requirements. To improve performance, the data ingestion system may utilize the cache component for accessing the data structure. The cache component may enable near-real time computation which, in turn, reduces latency and improves performance of the data ingestion system. In some implementations, the data ingestion system may contextualize and provide the stored data to other infrastructures, such as the 3D digital twin architecture, for 3D image rendering. The data ingestion system may also utilize the contextualized data for predictive analytics by training and reactive maintenance.

Figure 1H:
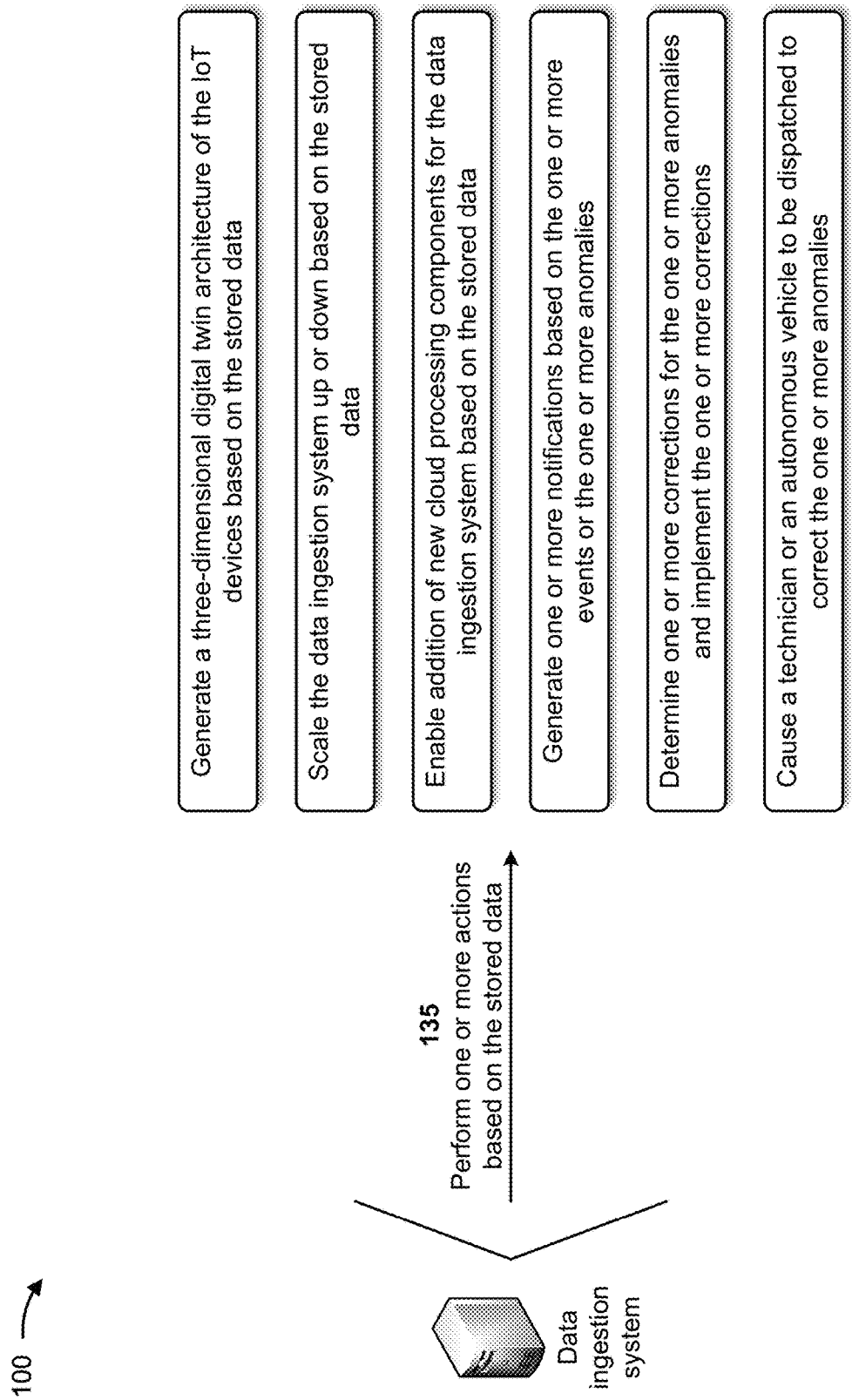

As shown in FIG. 1H, and by reference number 135, the data ingestion system may perform one or more actions based on the stored data. In some implementations, performing the one or more actions includes the data ingestion system generating a 3D digital twin architecture of the IoT devices based on the stored data. For example, the data ingestion system may generate the 3D digital twin architecture based on the stored data, and may provide the 3D digital twin architecture for display to a user of the data ingestion system. The 3D digital twin architecture may provide digital representations of the IoT devices that serve as digital counterparts of the IoT devices for simulations, integrations, testing, monitoring, maintenance, and/or the like. In this way, the data ingestion system may conserve computing resources, networking resources, and/or the like that would otherwise have been consumed in failing to integrate with the IoT devices.

In some implementations, performing the one or more actions includes the data ingestion system scaling the data ingestion system up or down based on the stored data. For example, the data ingestion system may be designed to scale up or down depending upon business needs. The scale of the data ingestion system may be adjusted to handle larger workloads and volume as needs change. In one example, the telemetry anomaly processing component may be scaled to detect, in parallel, data events in near-real time relative to receipt of the telemetry data. In this way, the data ingestion system may conserve computing resources, networking resources, and/or the like that would otherwise have been consumed in handling liability associated with failing to identify hazardous conditions with the IoT devices.

In some implementations, performing the one or more actions includes the data ingestion system enabling addition of new cloud processing components for the data ingestion system based on the stored data. For example, the data ingestion system may provide a plug-and-play feature that creates new cloud processing components based on business needs and using a data structure-driven approach with configuration parameters. A new function and/or execution stage may be created and configured into the data structure, and the orchestrator component may plug the new execution stage for further data processing into an updated chain of actions. In this way, the data ingestion system may conserve computing resources, networking resources, and/or the like that would otherwise have been consumed in expending time to update current IoT management systems.

In some implementations, performing the one or more actions includes the data ingestion system generating one or more notifications based on the one or more events or the one or more anomalies. For example, the telemetry anomaly processing component of the data ingestion system may utilize notification services to notify users about the occurrence of anomalies. Different types of notifications can be generated based on subscription, such as an email notification, a push notification, an SMS notification, and/or the like. The event processing component of the data ingestion system may generate similar notifications associated with the one or more events. In this way, the data ingestion system may conserve computing resources, networking resources, and/or the like that would otherwise have been consumed in handling liability associated with failing to identify hazardous conditions with the IoT devices.

In some implementations, performing the one or more actions includes the data ingestion system determining one or more corrections for the one or more anomalies and implementing the one or more corrections. For example, the data ingestion system may automatically resolve the one or more anomalies (e.g., with corrections) without manual intervention. If the anomaly is a temperature sensor exceeding a temperature threshold for manufacturing equipment, the correction may include increasing coolant flow to the equipment until the temperature falls below the temperature threshold. In this way, the data ingestion system may conserve computing resources, networking resources, and/or the like that would otherwise have been consumed in handling liability associated with failing to identify hazardous conditions with the IoT devices.

In some implementations, performing the one or more actions includes the data ingestion system causing a technician or an autonomous vehicle to be dispatched to correct the one or more anomalies. For example, the data ingestion system may identify an anomaly associated with an IoT device monitoring a tool. The data ingestion system may dispatch a technician or an autonomous vehicle to travel to the tool and correct the anomaly associated with the tool. In this way, the data ingestion system may conserve computing resources, networking resources, and/or the like that would otherwise have been consumed in correcting hazardous conditions after incurring the liability for the hazardous conditions.

In this way, the data ingestion system provides high performance IoT data ingestion and processing. For example, the data ingestion system may provide a comprehensive adaptive solution that receives heterogenous data from industry assets (e.g., IoT devices) of an industrial ecosystem. The data ingestion system may include a collection of cloud-based serverless components, chained together to transport data from multiple source systems, such as IoT devices, to a target destination such as a data structure. The adaptive nature of the data ingestion system enables addition and customization of components into a framework based on changing business needs. The data ingestion system may process large volumes of low latency data in near-real time before storing the data to a destination, which enables faster decision making even for complex processes. This, in turn, conserves computing resources, networking resources, and/or the like that would otherwise have been consumed in failing to integrate with the IoT devices, failing to understand unstructured data received from the IoT devices, expending time to update current IoT management systems, handling liability associated with failing to identify hazardous conditions with the IoT devices, correcting hazardous conditions after incurring the liability for the hazardous conditions, and/or the like.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2:
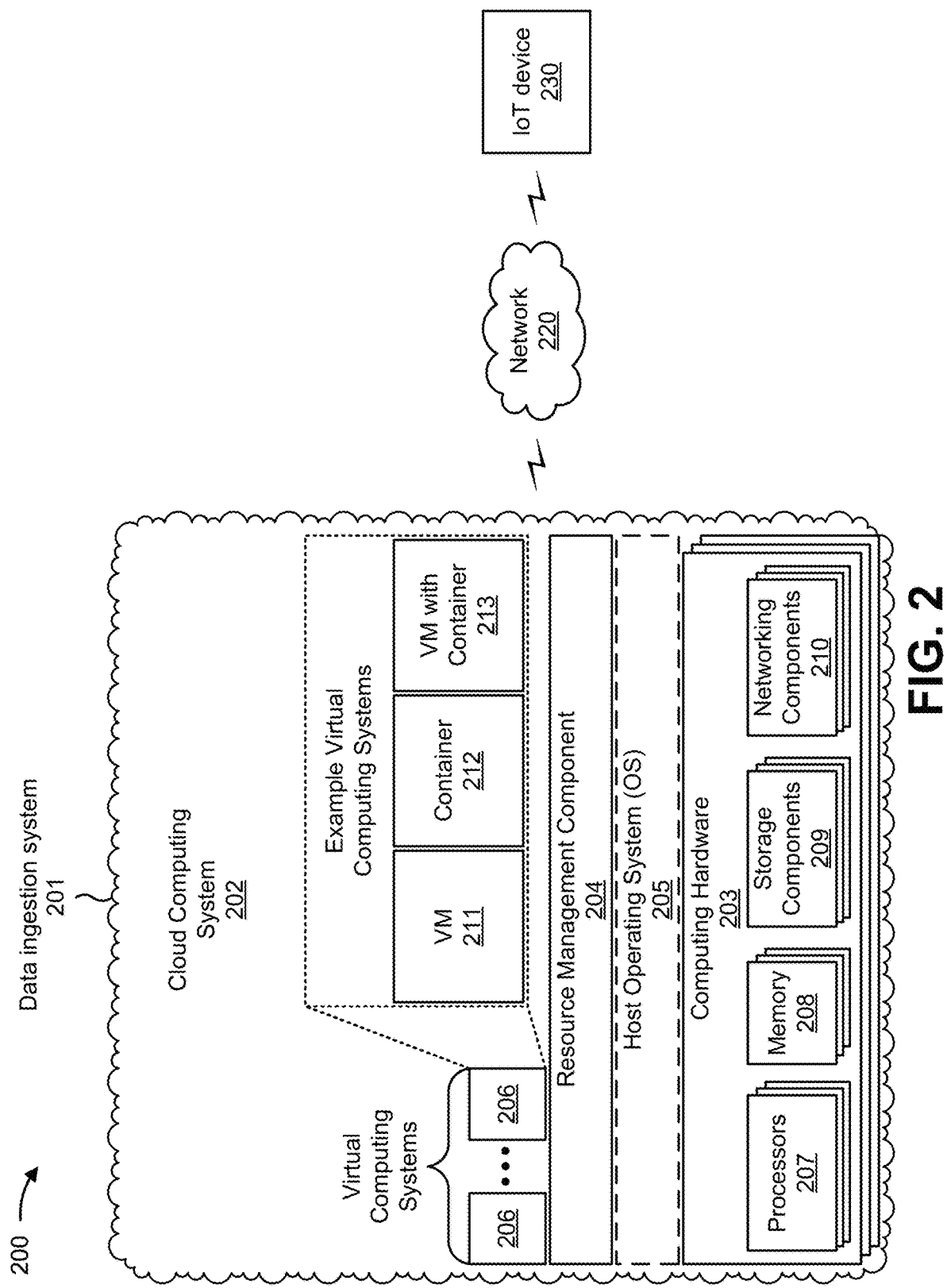
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a data ingestion system 201, which may include one or more elements of and/or may execute within a cloud computing system 202. The cloud computing system 202 may include one or more elements 203-213, as described in more detail below. As further shown in FIG. 2, the environment 200 may include a network 220 and/or an IoT device 230. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The resource management component 204 may perform virtualization (e.g., abstraction) of the computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although the data ingestion system 201 may include one or more elements 203-213 of the cloud computing system 202, may execute within the cloud computing system 202, and/or may be hosted within the cloud computing system 202, in some implementations, the data ingestion system 201 may not be cloud-based (e.g., may be implemented outside of a cloud computing system) or may be partially cloud-based. For example, the data ingestion system 201 may include one or more devices that are not part of the cloud computing system 202, such as a device 300 of FIG. 3, which may include a standalone server or another type of computing device. The data ingestion system 201 may perform one or more operations and/or processes described in more detail elsewhere herein.

The network 220 includes one or more wired and/or wireless networks. For example, the network 220 may include a cellular network, a public land mobile network (PLMN), a local area network (LAN), a wide area network (WAN), a private network, the Internet, and/or the like, and/or a combination of these or other types of networks. The network 220 enables communication among the devices of the environment 200.

The IoT device 230 includes one or more devices capable of gathering, receiving, storing, processing, providing, and/or transmitting information and/or data. For example, the IoT device 230 may include a network device (e.g., a modem, a switch, a gateway, or the like), a sensing device, a metering device, a mobile phone (e.g., a smart phone, a radiotelephone, or the like), a computing device (e.g., a server, a desktop computer, a laptop computer, a tablet computer, a handheld computer, a camera, an audio recorder, a camcorder, or the like), an appliance (e.g., a thermostat, an oven, a refrigerator, a microwave, a stove, or the like), a medical device, a biometric device, a wearable device, an automobile, an airplane, a railcar, a light bulb, a switch, an actuator, a timer, a signal detection device (e.g., to detect the presence of a signal, such as a Bluetooth signal, an infrared signal, or the like), a machine-to-machine (M2M) device, and/or a similar device. In other words, the IoT device 230 may be any "thing" in the IoT. In some implementations, the IoT device 230 may include an interface for short range wireless communication protocols (e.g., Bluetooth low energy, Institute of Electrical and Electronics Engineers (IEEE) 802.15.4 ZigBee, and/or the like) and/or long range wireless communication protocols (e.g., LTE category M1, 5G category M1, LTE category NB-IOT, 5G category NB-IOT, 3G, 2G GSM, and/or the like) that may allow the IoT device 230 to receive information from and/or transmit information to another device in the environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
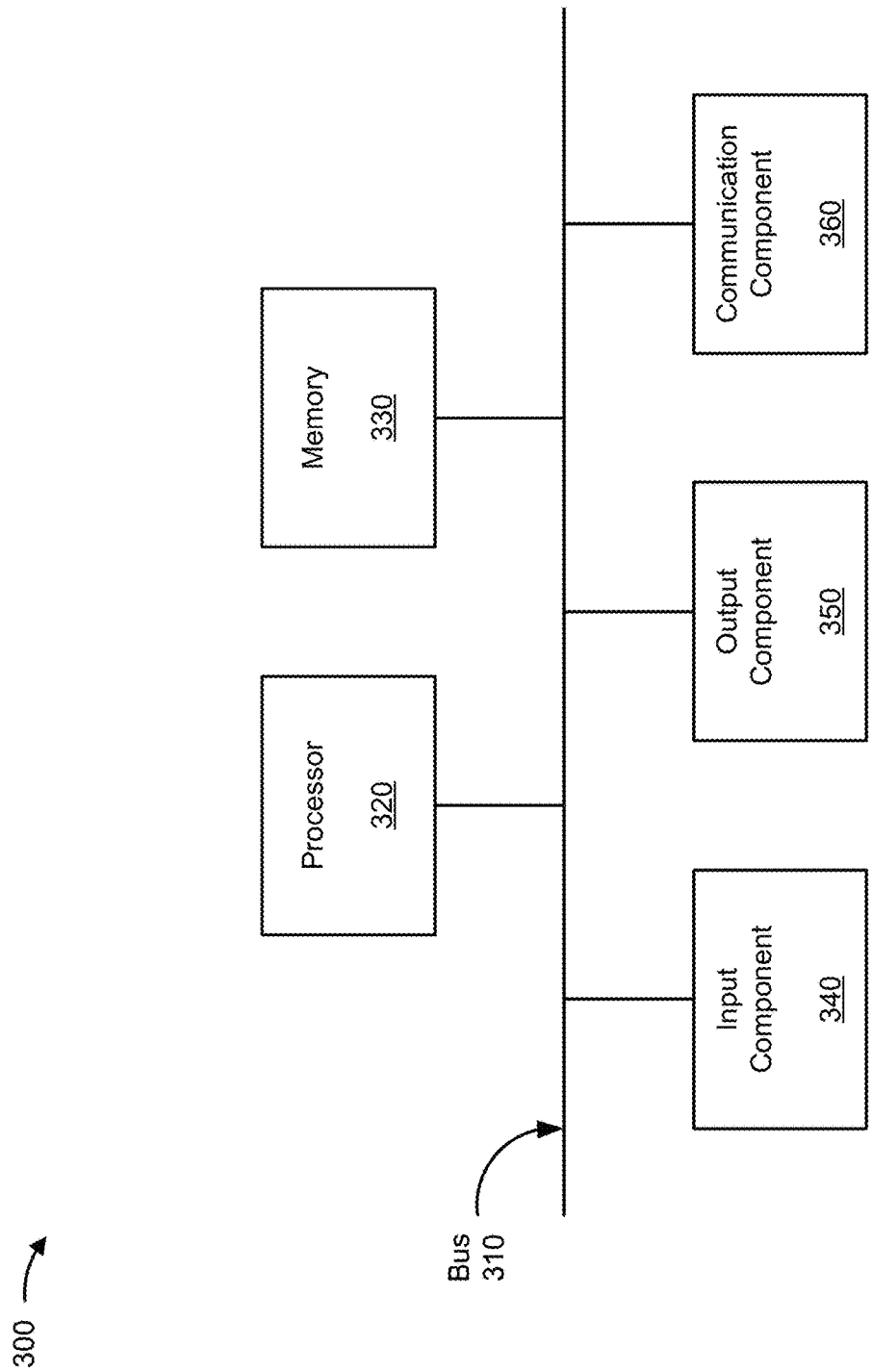
FIG. 3 is a diagram of example components of one or more devices of FIG. 2.

FIG. 3 is a diagram of example components of a device 300, which may correspond to the data ingestion system 201 and/or the IoT device 230. In some implementations, the data ingestion system 201 and/or the IoT device 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes a component that enables wired and/or wireless communication among the components of device 300. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform a function. The memory 330 includes a random-access memory, a read only memory, and/or another type of memory (e.g., a flash memory, a magnetic memory, and/or an optical memory).

The input component 340 enables the device 300 to receive input, such as user input and/or sensed inputs. For example, the input component 340 may include a touch screen, a keyboard, a keypad, a mouse, a button, a microphone, a switch, a sensor, a global positioning system component, an accelerometer, a gyroscope, an actuator, and/or the like. The output component 350 enables the device 300 to provide output, such as via a display, a speaker, and/or one or more light-emitting diodes. The communication component 360 enables the device 300 to communicate with other devices, such as via a wired connection and/or a wireless connection. For example, the communication component 360 may include a receiver, a transmitter, a transceiver, a modem, a network interface card, an antenna, and/or the like.

The device 300 may perform one or more processes described herein. For example, a non-transitory computer-readable medium (e.g., the memory 330) may store a set of instructions (e.g., one or more instructions, code, software code, program code, and/or the like) for execution by the processor 320. The processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
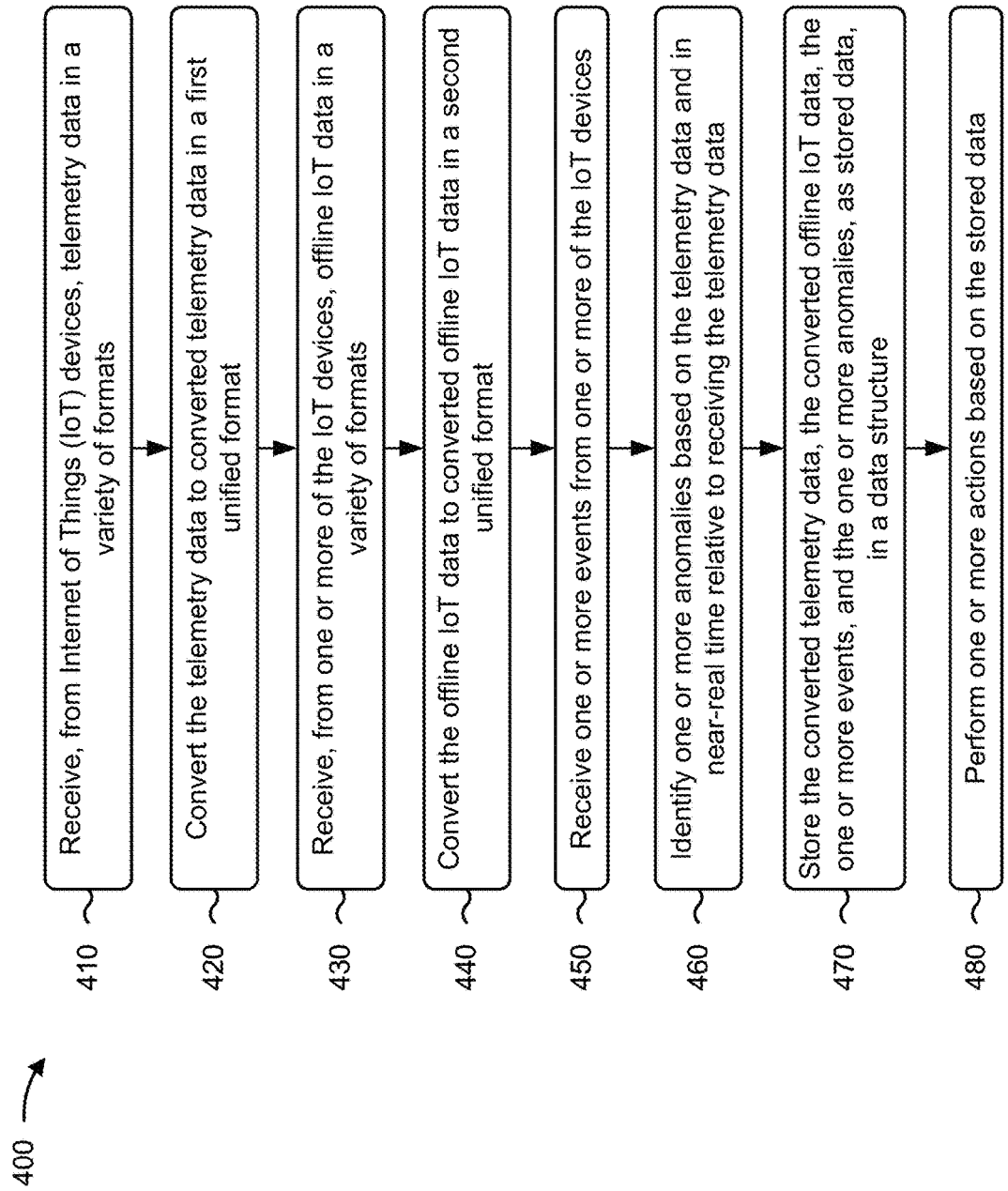
FIG. 4 is a flowchart of an example process for providing high performance IoT data ingestion and processing.

FIG. 4 is a flowchart of an example process 400 for providing high performance IoT data ingestion and processing. In some implementations, one or more process blocks of FIG. 4 may be performed by a device (e.g., the data ingestion system 201). In some implementations, one or more process blocks of FIG. 4 may be performed by another device or a group of devices separate from or including the device, such as an IoT device (e.g., the IoT device 230). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving, from IoT devices, telemetry data in a variety of formats (block 410). For example, the device may receive, from IoT devices, telemetry data in a variety of formats, as described above.

As further shown in FIG. 4, process 400 may include converting the telemetry data to converted telemetry data in a first unified format (block 420). For example, the device may convert the telemetry data to converted telemetry data in a first unified format, as described above. In some implementations, converting the telemetry data to the converted telemetry data includes processing the telemetry data, with customizable filters, to convert the telemetry data to the converted telemetry data. In some implementations, converting the telemetry data to the converted telemetry data includes utilizing an orchestrator to define one or more execution stages for processing the telemetry data, and processing the telemetry data, with the one or more execution stages, to convert the telemetry data to the converted telemetry data. In some implementations, converting the telemetry data to the converted telemetry data includes formatting the telemetry data to a common structure payload, retrieving contextualized data about the IoT devices, and converting the telemetry data to the converted telemetry data based on the common structure payload and the contextualized data.

As further shown in FIG. 4, process 400 may include receiving, from one or more of the IoT devices, offline IoT data in a variety of formats (block 430). For example, the device may receive, from one or more of the IoT devices, offline IoT data in a variety of formats, as described above.

As further shown in FIG. 4, process 400 may include converting the offline IoT data to converted offline IoT data in a second unified format (block 440). For example, the device may convert the offline IoT data to converted offline IoT data in a second unified format, as described above. In some implementations, converting the offline IoT data to the converted offline IoT data includes reformatting the offline IoT data to the converted offline IoT data in a common file format.

As further shown in FIG. 4, process 400 may include receiving one or more events from one or more of the IoT devices (block 450). For example, the device may receive one or more events from one or more of the IoT devices, as described above. In some implementations, the one or more events include one or more of a deletion of one of the IoT devices, an addition of a new IoT device, or a disconnection of one of the IoT devices.

As further shown in FIG. 4, process 400 may include identifying one or more anomalies based on the telemetry data and in near-real time relative to receiving the telemetry data (block 460). For example, the device may identify one or more anomalies based on the telemetry data and in near-real time relative to receiving the telemetry data, as described above. In some implementations, identifying the one or more anomalies includes comparing the telemetry data to thresholds in near-real time, and identifying the one or more anomalies based on comparing the telemetry data to the thresholds.

As further shown in FIG. 4, process 400 may include storing the converted telemetry data, the converted offline IoT data, the one or more events, and the one or more anomalies, as stored data, in a data structure (block 470). For example, the device may store the converted telemetry data, the converted offline IoT data, the one or more events, and the one or more anomalies, as stored data, in a data structure, as described above. In some implementations, the data structure is associated with a caching mechanism that accesses the data structure.

As further shown in FIG. 4, process 400 may include performing one or more actions based on the stored data (block 480). For example, the device may perform one or more actions based on the stored data, as described above. In some implementations, performing the one or more actions includes generating a 3D digital twin architecture of the IoT devices based on the stored data. In some implementations, performing the one or more actions includes one or more of scaling the device up or down based on the stored data, or enabling addition of new cloud processing components for the device based on the stored data. In some implementations, performing the one or more actions includes one or more of generating one or more notifications based on the one or more events or the one or more anomalies, or causing a technician or an autonomous vehicle to be dispatched to correct the one or more anomalies. In some implementations, performing the one or more actions includes determining one or more corrections for the one or more anomalies, and implementing the one or more corrections.

In some implementations, process 400 includes receiving IoT device data associated with the IoT devices, and registering the IoT devices with the device based on the IoT device data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device and from Internet of Things (IOT) devices, telemetry data in a variety of formats;
   converting, by the device, the telemetry data to converted telemetry data in a first unified format;
   receiving, by the device and from one or more of the IoT devices, offline IoT data in a variety of formats;
   converting, by the device, the offline IoT data to converted offline IoT data in a second unified format;
   receiving, by the device, one or more events from one or more of the IoT devices;
   identifying, by the device, one or more anomalies based on the telemetry data;

storing, by the device, the converted telemetry data, the converted offline IoT data, the one or more events, and the one or more anomalies, as stored data, in a data structure; and performing, by the device, one or more actions based on the stored data.

2. The method of claim 1, further comprising:
receiving IoT device data associated with the IoT devices; and
registering the IoT devices with the device based on the IoT device data.

3. The method of claim 1, wherein converting the telemetry data to the converted telemetry data comprises:
processing the telemetry data, with customizable filters, to convert the telemetry data to the converted telemetry data.

4. The method of claim 1, wherein converting the offline IoT data to the converted offline IoT data comprises:
reformatting the offline IoT data to the converted offline IoT data in a common file format.

5. The method of claim 1, wherein converting the telemetry data to the converted telemetry data comprises:
utilizing an orchestrator to define one or more execution stages for processing the telemetry data; and
processing the telemetry data, with the one or more execution stages, to convert the telemetry data to the converted telemetry data.

6. The method of claim 1, wherein the one or more events include one or more of:
a deletion of one of the IoT devices,
an addition of a new IoT device, or
a disconnection of one of the IoT devices.

7. The method of claim 1, wherein identifying the one or more anomalies comprises:
comparing the telemetry data to thresholds; and
identifying the one or more anomalies based on comparing the telemetry data to the thresholds.

8. A device, comprising:
one or more memories; and
one or more processors, coupled to the one or more memories, configured to:
receive Internet of Things (IOT) device data associated with IoT devices;
register the IoT devices with the device based on the IoT device data;
receive, from the IoT devices, telemetry data in a variety of formats;
convert the telemetry data to converted telemetry data in a first unified format;
receive, from one or more of the IoT devices, offline IoT data in a variety of formats;
convert the offline IoT data to converted offline IoT data in a second unified format;
receive one or more events from one or more of the IoT devices;
identify one or more anomalies based on the telemetry data;
store the converted telemetry data, the converted offline IoT data, the one or more events, and the one or more anomalies, as stored data, in a data structure; and
perform one or more actions based on the stored data.

9. The device of claim 8, wherein the data structure is associated with a caching mechanism that accesses the data structure.

10. The device of claim 8, wherein the one or more processors, to convert the telemetry data to the converted telemetry data, are configured to:

format the telemetry data to a common structure payload;
retrieve contextualized data about the IoT devices; and
convert the telemetry data to the converted telemetry data based on the common structure payload and the contextualized data.

11. The device of claim 8, wherein the one or more processors, to perform the one or more actions, are configured to:
generate a three-dimensional (3D) digital twin architecture of the IoT devices based on the stored data.

12. The device of claim 8, wherein the one or more processors, to perform the one or more actions, are configured to one or more of:
scale the device up or down based on the stored data; or
enable addition of new cloud processing components for the device based on the stored data.

13. The device of claim 8, wherein the one or more processors, to perform the one or more actions, are configured to one or more of:
generate one or more notifications based on the one or more events or the one or more anomalies; or
cause a technician or an autonomous vehicle to be dispatched to correct the one or more anomalies.

14. The device of claim 8, wherein the one or more processors, to perform the one or more actions, are configured to:
determine one or more corrections for the one or more anomalies; and
implement the one or more corrections.

15. A non-transitory computer-readable medium storing a set of instructions, the set of instructions comprising:
one or more instructions that, when executed by one or more processors of a device, cause the device to:
receive, from Internet of Things (IOT) devices, telemetry data in a variety of formats;
convert the telemetry data to converted telemetry data in a first unified format;
receive, from one or more of the IoT devices, offline IoT data in a variety of formats;
convert the offline IoT data to converted offline IoT data in a second unified format;
receive one or more events from one or more of the IoT devices,
wherein the one or more events include one or more of:
a deletion of one of the IoT devices,
an addition of a new IoT device, or
a disconnection of one of the IoT devices;
identify one or more anomalies based on the telemetry data;
store the converted telemetry data, the converted offline IoT data, the one or more events, and the one or more anomalies, as stored data, in a data structure; and
perform one or more actions based on the stored data.

16. The non-transitory computer-readable medium of claim 15, wherein the one or more instructions, that cause the device to convert the telemetry data to the converted telemetry data, cause the device to:
process the telemetry data, with customizable filters, to convert the telemetry data to the converted telemetry data.

17. The non-transitory computer-readable medium of claim 15, wherein the one or more instructions, that cause the device to convert the offline IoT data to the converted offline IoT data, cause the device to:
reformat the offline IoT data to the converted offline IoT data in a common file format.

18. The non-transitory computer-readable medium of claim 15, wherein the one or more instructions, that cause the device to convert the telemetry data to the converted telemetry data, cause the device to:
- utilize an orchestrator to define one or more execution stages for processing the telemetry data; and
- process the telemetry data, with the one or more execution stages, to convert the telemetry data to the converted telemetry data.

19. The non-transitory computer-readable medium of claim 15, wherein the one or more instructions, that cause the device to identify the one or more anomalies, cause the device to:
- compare the telemetry data to thresholds; and
- identify the one or more anomalies based on comparing the telemetry data to the thresholds.

20. The non-transitory computer-readable medium of claim 15, wherein the one or more instructions, that cause the device to convert the telemetry data to the converted telemetry data, cause the device to:
- format the telemetry data to a common structure payload;
- retrieve contextualized data about the IoT devices; and
- convert the telemetry data to the converted telemetry data based on the common structure payload and the contextualized data.

\* \* \* \* \*

UNITED STATES PATENT AND TRADEMARK OFFICE
CERTIFICATE OF CORRECTION

PATENT NO. : 12,074,776 B1
APPLICATION NO. : 18/189036
DATED : August 27, 2024
INVENTOR(S) : Gurnani et al.

Page 1 of 1

It is certified that error appears in the above-identified patent and that said Letters Patent is hereby corrected as shown below:

On the Title Page

Item "(72) Inventors", Lines 9-12, delete "Amit Dhiman, Gurugram (IN); Sivanandam Thirunavukarasu, Yamunanagar (IN); Dhamini Kandhavelu, Vadalur (IN)" and insert -- Amit Dhiman, Yamunanagar (IN); Sivanandam Thirunavukarasu, Vadalur (IN); Dhamini Kandhavelu, Coimbature (IN) --, therefor.

Item "(57) ABSTRACT" Line 1, delete "(IOT)" and insert -- (IoT) --, therefor.

In the Claims

In Column 16, Line 56, in Claim 1, delete "(IOT)" and insert -- (IoT) --, therefor.

In Column 17, Line 42, in Claim 8, delete "(IOT)" and insert -- (IoT) --, therefor.

In Column 18, Line 34, in Claim 15, delete "(IOT)" and insert -- (IoT) --, therefor.

Signed and Sealed this
Thirty-first Day of December, 2024

Derrick Brent
*Acting Director of the United States Patent and Trademark Office*